United States Patent
Moore

(10) Patent No.: US 6,479,625 B1
(45) Date of Patent: Nov. 12, 2002

(54) MECHANICAL STRESS CRYSTALLIZATION OF THERMOPLASTIC POLYMERS

(75) Inventor: William P. Moore, Hopewell, VA (US)

(73) Assignee: Agri-Nutrients Technology Group, Inc., Disputanta, VA (US)

( * ) Notice: Subject to any disclaimer, the term of this patent is extended or adjusted under 35 U.S.C. 154(b) by 0 days.

(21) Appl. No.: 10/155,030

(22) Filed: May 28, 2002

(51) Int. Cl.$^7$ .................................................. C08F 6/00
(52) U.S. Cl. ..................... 528/481; 264/176.1; 528/176; 528/196; 528/198; 528/271; 528/272; 528/332; 528/480; 528/502
(58) Field of Search .................................. 528/176, 480, 528/481, 502, 196, 198, 271, 272, 332; 264/176.1

(56) References Cited

U.S. PATENT DOCUMENTS 3,544,523 A * 12/1970 Maxion ...................... 525/437
5,714,571 A * 2/1998 Al Ghatta et al. ........ 528/308.2
6,159,406 A * 12/2000 Shelby et al. ............. 264/176.1
6,344,539 B1 * 2/2002 Palmer ....................... 528/481

* cited by examiner

*Primary Examiner*—Terressa M. Boykin

(57) ABSTRACT

A method of crystallizing particles of amorphous thermoplastic polymer particles in a mechanically fluidizing horizontal cylindrical crystallizer so that each particle is crystallized to substantially the same degree without particle agglomeration or stickiness in the crystallizer or the product. The method comprises mechanically fluidizing the particles with fluidizing blades providing mechanical friction, heat, and deformation stress until the stress orients the polymer molecules to form polymer crystals. The method is particularly useful with polyesters, polyester copolymers and low melting blends thereof. A new crystallized polymer composition prepared by the mechanical stress method is disclosed.

25 Claims, No Drawings

MECHANICAL STRESS CRYSTALLIZATION OF THERMOPLASTIC POLYMERS

BACKGROUND OF THE INVENTION

1. Field of the Invention

The present invention relates to thermoplastic polymers and methods for the crystallization of these polymers. More particularly, it relates to the discovery that the thermoplastic polymers may be expeditiously crystallized by the application of mechanical stress and heat to particles of the polymer without the hazard of stickiness and agglomeration of the polymer particles in the crystallizer.

2. Description of Prior Art

Crystallization of many thermoplastic polymers is necessary to make them workable in further processing steps toward the preparation of plastic end products. Crystallization is particularly important where the polymers are amorphous polymers, copolymers, or polymer blends which become sticky and agglomerate at relatively low temperatures. Without crystallization it is difficult to handle these polymer particles in blow molding, extrusion, and blending operations without problems of agglomeration of the polymer particles and sticking of the polymer to operating equipment. Polyesters of various types and copolymers containing polyesters usually must be crystallized before further processing, for example by "solid state" heating to increase melting points. Polyester particles tend to become sticky and agglomerate at temperatures much lower than their crystallization temperature, and are importantly typical of thermoplastic polymers in general.

Thermoplastic polymers have been crystallized by slowly heating the polymer particles through a sticky phase which occurs at temperatures somewhat lower than the crystallization temperature of the polymer. The polymer particles are slowly heated further to where the amorphous polymer chains are converted to crystals usually with the release of exothermic heat from the crystallization. It has been necessary to approach the exothermic phase slowly to prevent runaway temperature rises which can damage the physical properties and color of the polymers. With slow heating of the polymers long term elevated temperatures still can cause thermal damage to the polymers and yellowing of the product.

Even with slow heating using the present state of the art, parts of the thermoplastic particles become overheated, and semimelted so that the particles become sticky and agglomerate to form large masses in the crystallization equipment. This can damage the apparatus and the polymer properties, such as the intrinsic viscosities, melting points, and particle sizes.

The main prior art slow heat crystallization method requires the use of large vessel volumes per unit of production and the use of large amounts of inert gas, such as nitrogen, which is passed through the crystallizer to protect the hot thermoplastic from oxidation during the long hold up time required.

Tung et al in U.S. Pat. No. 5,919,872 disclosed that polyethylene terephthalate polyesters when coated with alkylene carbonates crystallize more quickly and at lower temperatures than the same uncoated polymers.

Herse et al in U.S. Pat. No. 5,663,290 disclosed crystallization of poly(ethylenenaphthalenedicarboxylate) and its copolymers by maintaining water content below a critical point throughout the crystallizing process so that a separate drying step is not required.

Keilert in U.S. Pat. No. 5,628,947 also disclosed a process for simultaneous drying and crystallization of crystallizable thermoplastics, by cooling strands of extruded polymer in 1.5 to 20 seconds.

Palmer in U.S. Pat. No. 6,344,539 discloses a process for crystallizing polyester granules providing a bi-component structure consisting of a thin crystalline skin and an amorphous interior. The crystalline skin prevents the granules from sticking in subsequent hot processing and the amorphous interior facilitates melting at lower temperatures in subsequent extrusion processes.

U.S. Pat. No. 3,544,523 to Mobil Oil teaches that polyester granules may be prevented from sticking by coating the granules with a small amount of anti-caking agent such as talc.

Al Ghatta et al in U.S. Pat. No. 5,714,571 disclose a method of continuous crystallization of polyester resin in a whirling fluid bed crystallizer where fluiding nitrogen gas enters at a temperature not lower than 195° C. and the average residence time of the polymers is higher than 5 minutes. Feeding the polymer from the fluid bed to a mechanical mixer, which moves the polymer longitudinally submitting the polymer to radial mixing, is disclosed. The fluid bed disclosed uses non-backmix piston type continuous flow to obtain uniform crystallization values in the product. The fluidization velocities of the nitrogen gas through the fluid bed is between 3 and 5 meters per second. The crystallinity degree of the polymer coming out of the fluid bed treatment is between 38 and 42 percent and is brought to 40 to 50 percent by subsequent crystallization processes which are conveniently carried out by moving longitudinally through a mechanical mixer at temperatures 10 to 30° C. higher than that of the polymer leaving the fluid bed. Another fluid bed may be used instead of a mechanical mixer.

Shelby et al in U.S. Pat. No. 6,159,406 disclose a process for introducing strain-induced crystallization to polyesters by sending amorphous polyesters directly from a melt phase reactor through a traditional strand die and then uniaxially stretching the extruded polymer strand resulting in an increased rate of crystallization than obtained with traditional thermal crystallization.

In summary, the prior art provides for the crystallization of thermoplastic polymers by: (1) an inert gas-fluidized bed of polymer particles with the use of large amounts of difficult to heat and expensive inert gas; (2) continuously stretching strands of polymer to increase the rate of thermal crystallization requiring a melt extruder and strand chopper at the site of the crystallization operation; (3) the use of a whirling fluid bed crystallizer heated by inert gas at more than 195° C. at a velocity of 3 to 5 meters per second to obtain 38 to 42 percent crystallization requiring the operation of a sophisticated industrial installation; and the addition of costly property changing coatings to the polymers.

OBJECTS OF THE INVENTION

It is therefore an object of this invention to provide an effective, non-agglomerating, method of crystallizing crystallizable thermoplastic polymers in a simple mechanically fluidized crystallizer where the friction generated in the mechanical fluidization deforms the polymer particles to create sufficient stress in the polymer particles to orient the polymer molecules into crystals with the heat generated by the mechanical fluidization.

It is also an object to provide a method of crystallization that does not require the flow or heating of inert gases.

It is a further object to provide a method of crystallization that requires no additives.

It is a further object to provide a method which may be operated at locations remote from sophisticated industrial installations, not requiring melting, extrusion, stretching, quenching, chopping, drying, or solid state polymerizations of the polymers.

It is a further object to provide a method which allows the crystallization of the polymers accurately to the degree of crystallization desired.

It is a further object to provide a method which is particularly effective in crystallizing polyester polymers and copolymers which are difficult to crystallize without agglomeration.

SUMMARY OF THE INVENTION

I have now discovered that deformation of crystallizable thermoplastic polymer particles applied in a mechanically fluidized crystallizer creates heat of friction and mechanical stress on the particles sufficient to align the polymer molecules into crystallized polymers without agglomeration of the polymer, and I have also found that desired degrees of crystallinity may be obtained in the polymer particles by the accurate control of temperature and stress treatment time in a mechanically fluidized crystallizer. The discovery overcomes the limitations of the prior art and provides the objects of the invention with a practical method of crystallizing thermoplastic polymers in a controlled manner without agglomeration.

DETAILED DESCRIPTION OF THE INVENTION

I have now discovered a method of accurately crystallizing particles of crystallizable amorphous thermo-plastic polymers in a mechanically fluidizing crystallizer which provides heat and mechanical stress to the polymers sufficient to crystallize the polymers without agglomeration of the polymer particles in the crystallizer. In the instant method, amorphous thermoplastic polymer particles are mechanically fluidized in a cylindrical crystallizer by means of fluidizing blades moving around, and in close proximity to, the inner perimeter wall of the crystallizer.

The fluidizing blades are moved around the inner perimeter wall of the crystallizer at speeds which cause mechanical friction between the polymer particles and the wall of the crystallizer, the fluidizing blades, and other polymer particles, with the friction providing heat and mechanical stress on the polymer particles by deforming them.

The mechanical stress must be maintained on the polymer particles at temperatures exceeding the crystallization temperature of the polymer until sufficient stress is provided to align the molecules of the polymer into crystal lattices, forming crystallized polymer particles without agglomeration of the particles in the crystallizer.

The severity of the mechanical deformation and the stress and heat created thereby may be regulated to provide the amount of crystallization required in the crystallized polymer particles.

Temperature control is required during crystallization and the fluidizing blades moving around, and in close proximity to, the inner perimeter wall, provide effective contact heat transfer between the wall of the crystallizer and the polymer particles for heating or cooling.

The heat provided by the friction of the blades usually amounts to a majority of the heat required to maintain the temperatures exceeding the crystallization temperatures of the polymers.

Although the crystallized polymer particles are sometimes advanced to further processing steps such as solid state polymerization and blow or injection molding, the crystallized particles are usually cooled to ambient temperature. The cooling may be done by contact cooling through the crystallizer wall batchwise or may be done in a separate cooling device either continuous or batchwise.

A variety of amorphous thermoplastic polymers may be crystallized by the instant method including polyesters, polyolefins, polycarbonates, polyamides, and polyphenylene sulfides.

The method is particularly useful where the amorphous thermoplastic polymers include biodegradable polyester copolymer blends, silicone polyester copolymers and liquid crystal polyester copolymers which exhibit softening temperatures lower than 100° C.

It is preferred to carry out the instant method when the mechanical friction is maintained for a period of time between 20 and 200 minutes until sufficient mechanical stress is provided to the polymer particles at temperatures exceeding the crystallization temperature of the polymer by between 10 and 50° C. When the minimum friction time and temperature were not provided, crystallization was insufficient to prevent sticking of the particles in subsequent operations. When the temperatures were exceeded, crystallization was achieved but some sticking occurred on the heat transfer walls of the crystallizer.

The crystallizer wall temperatures are preferably maintained within 30° C. of the temperature of the polymer particles to assure effective heat transfer to or from the wall and to provide agglomerate-free crystallizer operation.

It is unnecessary to provide a fluidizing flow of inert gas to achieve excellent crystallization in the instant method, and it is possible to use the method allowing ambient air to be in the crystallizer during operation. It is preferred, particularly when working with polymers exhibiting high crystallization temperatures, to blanket the. crystallizer and the polymer particles contained therein with inert gas to exclude air and prevent oxidative degradation of the polymer particles during crystallization.

The instant method may be controlled so that a thin coating of crystallization is applied to the surface of the polymer particles where the subsequent treatments require only a small degree of crystallization to provide non-sticking subsequent operations with the polymer products. It is preferred to maintain the mechanical friction in the instant crystallization method until between 20 and 80 percent of the polymers are crystallized.

If more crystal content in the polymer particles is desired, the amount of crystallized polymer formed may be increased by increasing the time that the mechanical friction is maintained.

A variety of mechanically fluidized crystallizers may be used in the instant method. The method is preferably operated where the particles of amorphous thermoplastic polymers are mechanically fluidized in a horizontal cylindrical crystallizer by means of a plurality of fluidizing blades, each attached to a center horizontal shaft rotating so that the paths of the blades substantially cover the inner perimeter wall of the crystallizer.

A more preferable operation of the instant. method is where the horizontal cylindrical crystallizer is equipped, in addition to the fluidizing blades, with one or more high speed mixing blades spinning at the end of a shaft coming through the perimeter wall of the crystallizer, with the high speed blades turbulently agitating the fluided polymer particles to improve contact heat transfer in the crystallizer.

Best heat contact heat transfer is obtained where the high speed mixing blades exhibit lengths between 10 and 30 percent of the diameter of the cylindrical crystallizer and spins with blade tip speeds between 7 and 30 times faster than the linear speeds of the fluidizing blades.

The use of the instant method allows the preparation of a new crystallized thermoplastic polymer composition in which each particle is crystallized to substantially the same degree, between 20 and 80 percent crystals, and free of agglomerates.

The instant method may be used with a wide range of crystallizable thermoplastic polymers which exhibit quite different crystallization temperatures, the method is effective where the temperatures of operations exceeding the crystallization temperature are between 60 and 300° C.

The method is particularly effective at remote sites distant from manufacturing plants and is there frequently operated batchwise on either large or small scales. Conversely, especially where large production rates are required, the method is operated where the amorphous thermoplastic polymer particles are continuously mechanically fluidized, stressed, and heated to form crystallized polymer particles without agglomeration of the polymer particles in the crystallizer.

Although all crystallizable thermoplastic polymers must be crystallized carefully, polyester polymer present the largest crystallization problem because the polyesters usually become sticky at temperatures lower than their crystallization temperatures. Also, the polyester and polyester derived polymers comprise one of the largest polymer markets where the copolymer particles must be crystallized frequently remote from their production site.

A stepwise method has been found for crystallizing amorphous polyester polymer particles in a mechanically fluidizing horizontal cylindrical crystallizer without stickiness in the crystallizer.

In the first step amorphous polyester polymer particles are mechanically fluidized in a horizontal cylindrical crystallizer by means of fluidizing blades moving around, and within between 1 and 30 millimeters of the inner perimeter wall of the crystallizer.

In the second step the fluidizing blades are moved around the perimeter wall of the crystallizer at speeds between 2 and 12 meters per second to cause mechanical friction between the polymer particles and the wall of the crystallizer, the fluidizing blades, and other polymer particles, the friction providing heat and mechanical stress to the polymer particles by deforming the particles until the stress orients the polymer molecules in the direction of the stress to form polyester polymer crystals.

The third step comprises adding heat or cooling as needed for the crystallization by contact heat transfer through the inner wall of the crystallizer to regulate the temperature of the wall of the crystallizer to within 30° C. of the temperature of the particle wall.

In the fourth step the mechanical friction is maintained for a period of time between 5 and 200 minutes until sufficient mechanical friction is provided to the polymer particles to generate polymer particle temperatures exceeding the polymer crystallization temperature by between 10 and 50° C. and sufficient stress is provided to orient the polymer molecules so that the particles contain between 20 and 80 percent crystals.

Finally the crystallized polyester polymer particles are cooled to ambient temperature.

The foregoing method is effective where the amorphous polyester polymer particles comprise between 5 and 50 percent copolymer.

To assure that no oxygen induced degradation occurs, the method is preferably operated where the horizontal cylindrical crystallizer contains nitrogen gas to exclude air from contact with the polyester polymer particles.

For high production rates of crystallized polymer particles, it is preferred to operate the horizontal cylindrical crystallizer in a continuous manner.

The horizontal cylindrical crystallizer may use a variety of fluidizing blades. To achieve efficient application of stress on the polymer particles and effective crystallization it is preferred that the fluidizing blades moving around and within between 1 and 30 millimeters of the inner perimeter wall of the crystallizer be formed in one of the following shapes: flat solid rectangles, flat solid triangles with their bases turned toward the crystallizer wall, curved solid rectangles, curved solid triangles, perforated shapes, and shovel shapes.

A wide variety of polyesters and their copolymers and blends may be crystallized effectively in the instant method. Amorphous polyester polymer particles which are preferably crystallized include polyethylene terephthalate, polybutylene terephthalate, polyethylene naphthalate, polyethylene naphthalene dicarboxylate, polyethylene isophthalate, and copolymers thereof.

When the method described in the foregoing paragraphs is used on amorphous polyester polymer particles, a new composition of polyester polymer particles, each substantially equally crystallized to between 20 and 80 percent crystal content and free of agglomerates, is formed.

Some of the terms used in this disclosure are defined as follows:

(1) Mechanical Stress means the strain created by the mechanical force exerted on one surface by another surface to deform or draw out the surfaces without breaking them.

(2) Mechanical Friction means the mechanical rubbing of one surface against another and the resistance to motion of. the surfaces that touch.

(3) Softening Temperature means the temperature where amorphous polymer particles soften and develop sticky surfaces.

(4) Crystallization Temperature means the temperature where amorphous polymer particles are converted to crystal form, usually determined in laboratory heating tests where changes in refractive indices of the polymers are observed.

(5) Degree of Crystallization is the portion of a polymer particle converted from amorphous to crystalline form measured by changes in refractive indices. Degree of crystallization may also be determined by use of a Densitometric Column.

MODE OF OPERATION OF THE INVENTION

Having described the basic concepts of the instant invention, reference is now made to the following examples which are provided to illustrate the effectiveness of the method of the instant invention and the utility of the product of the method.

EXAMPLE 1

This example demonstrates a stepwise method of crystallization of amorphous thermoplastic polymer particles in practical commercial equipment.

The thermoplastic polymer particles comprised a polyester copolymer containing about 80 percent polyethylene terephthalate and 20 percent polyethylene isophthalate. Preliminary laboratory tests showed that the polymer particles become tacky and agglomerated at temperatures of 75 to 80° C., and crystallized at temperatures between 110 and 135° C. The laboratory crystallized sample was found to contain a large part of the particles agglomerated on the walls of the test container.

The large scale mechanically fluidizing crystallizer comprised a horizontal cylindrical drum 92 centimeters in diameter and 184 centimeters long having a volume of 1200 liters equipped with a jacket for heating or cooling the inner perimeter wall of the crystallizer. The crystallizer was equipped with a horizontal shaft along the longitudinal axis of the drum connected to four fluidizing shovel blades moving along and within 5 to 10 millimeters of the inner perimeter wall of the crystallizer, to assure that the polymer particles are brought in contact with the blades, the crystallizer wall, and other particles with sufficient force to create mechanical stress and friction heat on the particles.

To the crystallizer was charged 600 kilograms of the polyester copolymer particles sized 55 particles per gram with a bulk density of 0.90 KG per liter. The fluidizing blades were started and moved around the inner perimeter wall of the crystallizer at a linear speed of 4.0 meters per second, causing mechanical friction between the polymer particles and the wall of the crystallizer, the fluidizing blades and other polymer particles to provide friction heat and mechanical stress to the polymer particles by deforming the particles.

The temperature of the polymer particles increased to 82° C. in 90 minutes as a result of the heat of friction generated in the crystallizer. There was a 25 percent increase in power input required to operate the fluidizing blades as the stress orientation of the polymer molecules in the direction of the stress occurred to form polyester polymer crystals as the temperature increased to 122° C. in 60 minutes. Cooling was then applied to remove the heat of crystallization and the cooling jacket temperature was maintained 30° C. lower than the polymer temperature until the crystallized polymer particles reached a temperature lower than 60° C.

Cooling of the polyester particles was continued until they reached ambient temperature. Light refraction tests indicated that the crystal content of the polyester granules was 42 percent. Inspection of the granules showed that the product was free of agglomerated granules, powder, or thin films. No polymer was found stuck in the crystallizer at the completion of the test.

EXAMPLE 2

This example demonstrates the necessity of the mechanical stress and friction heat to crystallize amorphous thermoplastic polymer particles without agglomeration of particles and sticking in the crystallizer.

The same copolymer used in Example 1 was charged to a rotating double cone mixer fitted with a jacket for heating and cooling. With the double cone rotating at 10 rpm, the particles were heated slowly over a four-hour period to 80° C. At 80° C. the particles clumped and formed agglomerates. Further heating to 109° C. started crystallization which was complete after 90 minutes as temperature rose to 125° C. with cooling applied to the walls of the double cone mixer. After discharging the crystallized polymer particles cooled to 40° C. from the double cone mixer, polymer particles amounting to 11 percent of the total mixture were found stuck to the walls of the mixer and agglomerates amounted to 3 percent of the product discharged from the double cone mixer.

EXAMPLE 3

This example demonstrates the utility of the new composition of polyester polymer particles prepared by the instant method.

Six samples were randomly taken throughout the product prepared in Example 1. Crystal content was determined by light refraction as follows:

| Sample No. | 1 | 2 | 3 | 4 | 5 | 6 |
|---|---|---|---|---|---|---|
| % Crystallinity | 41.7 | 42.6 | 43.0 | 42.1 | 42.7 | 41.9 |

The product of Example 1 was subjected to solid state polymerization by heating in a fixed bed for 4 hours at 220° C. without the particles agglomerating.

EXAMPLE 4

This example demonstrates the efficacy of the instant method for the crystallization of biodegradable blends of copolymers exhibiting very low softening temperatures.

The apparatus of Example 1 was used to crystallize a low softening temperature polyethylene terephthalate-polyethylene isophthalate copolymer containing 8 percent low molecular weight polyalkylene copolymer exhibiting in preliminary laboratory tests the following properties:

Temperature where particles become sticky, 50° C.
Crystallization Temperature, 80° C.
Melting Temperature, 155 to 196° C.

These copolymer particles were put through the same procedures as in Example 1, except for the following modifications:

(1) The fluidizing blades were operated at a linear speed of 2.5 meters per second.

(2) After 2 hours, the fluidized particles reached a temperature of 80° C. where exothermic crystallization started.

(3) The temperature increased to 94° C. in 0.33 hours and cooling was begun. During this time of crystallization, power applied to the fluidizing blades increased by 12 percent. On completion of the crystallization with cooling, the power requirement decreased to the initial level.

Light refraction tests indicated that the crystal content of the copolymer blend was 36 percent, and inspection of the crystallizer and the product showed no agglomeration or sticking.

I claim:

1. A method of crystallizing particles of amorphous thermoplastic polymers in a mechanically fluidizing crystallizer which provides heat and mechanical stress to the polymers sufficient to crystallize the polymers without agglomerization of the polymer particles in the crystallizer, the method comprising:

(a) mechanically fluidizing amorphous thermoplastic polymer particles in a cylindrical crystallizer by means of fluidizing blades moving around, and in close proximity to, the inner perimeter wall of the crystallizer;

(b) moving the fluidizing blades around the inner perimeter wall of the crystallizer at speeds which cause mechanical friction between the polymer particles and the wall of the crystallizer, the fluidizing blades, and other polymer particles, the friction providing heat and mechanical stress on the polymer particles by deforming them; and, (c) maintaining the mechanical stress on the polymer particles at temperatures exceeding the crystallization temperature of the polymer until sufficient stress is provided to align the molecules of the polymers into crystal lattices, forming crystallized polymer particles without agglomeration of the particles in the crystallizer.

2. The method of claim 1 wherein the fluiding blades moving around, and in close proximity to the inner perimeter wall, provide effective contact heat transfer between the wall and the polymer particles for heating or cooling of the particles.

3. The method of claim 1 wherein the heat provided by the friction of the blades amounts to a majority of the heat required to maintain the temperature of the polymer particles at temperatures exceeding the crystallization temperatures of the polymers.

4. The method of claim 1 wherein the crystallized polymer particles are cooled to ambient temperature.

5. The method of claim 1 wherein the crystallized polymer particles are heated to higher temperatures for further processing.

6. The method of claim 1 wherein the amorphous thermoplastic polymers are selected from the group consisting of polyesters, polyamides, polyolefins, polycarbonates, and polyphenylene sulfides.

7. The method of claim 1 wherein the amorphous thermoplastic polymers are selected from the group consisting of biodegradable copolymers blends, silicone polyester copolymers and liquid crystal copolymers which exhibit softening temperatures lower than 100° C.

8. The method of claim 1 wherein the mechanical friction is maintained for a period of time between 20 and 200 minutes until sufficient mechanical stress is provided to the polymer particles at temperatures exceeding the crystallization temperature of the polymer by between 10 and 50° C.

9. The method of claim 1 wherein the temperature of the wall of the crystallizer is maintained within 30° C. of the temperature of the polymer particles.

10. The method of claim 1 wherein the crystallizer and the polymer particles contained therein are blanketed with inert gas to exclude air and prevent degradation of the polymer particles during crystallization.

11. The method of claim 1 wherein the mechanical friction is maintained until between 20 and 80 percent of the polymers are crystallized.

12. The method of claim 1 wherein the amount of crystallized polymer formed is increased by increasing the time that the mechanical friction is maintained.

13. The method of claim 1 wherein the particles of amorphous thermoplastic polymers are mechanically fluidized in a horizontal cylindrical crystallizer by means of a plurality of fluidizing blades, each attached to a center horizontal shaft rotating so that the paths of the blades substantially cover the inner perimeter wall of the crystallizer.

14. The method of claim 1 wherein the horizontal cylindrical crystallizer in addition to the fluidizing blades, is equipped with one, or more, high speed mixing blades spinning at the end of a shaft coming through the perimeter wall of the crystallizer, with the high speed blades turbulently agitating the fluidized polymer particles to improve contact heat transfer in the crystallizer.

15. The method of claim 14 wherein the high speed mixing blades exhibit lengths between 10 and 30 percent of the diameter of the horizontal cylindrical crystallizer and spin with blade tip speeds between 7 and 30 times faster than the linear speeds of the fluidizing blades.

16. A new crystallized thermoplastic polymer composition in which each particle is crystallized to substantially the same degree, between 20 and 80 percent crystals, and free of agglomerates, prepared by the method of claim 1.

17. The method of claim 1 wherein the temperatures of operations, exceeding the crystallization temperatures, are between 60 and 300° C.

18. The method of claim 1 wherein the amorphous thermoplastic polymer particles are continuously mechanically fluidized, stressed and heated to form crystallized polymer particles without agglomeration of the polymer particles in the crystallizer.

19. A stepwise method of crystallization amorphous polyester polymer particles in a mechanically fluidizing horizontal cylindrical crystallizer without stickiness in the crystallizer, the method comprising:

(a) mechanically fluidizing amorphous polyester polymer particles in a horizontal cylindrical crystallizer by means of fluidizing blades moving around, and within between 1 and 30 millimeters of the inner perimeter wall of the crystallizer;

(b) moving the fluidizing blades around the inner perimeter wall of the crystallizer at speeds between 2 and 12 meters per second to cause mechanical friction between the polymer particles and the wall of the crystallizer, the fluidizing blades, and other polymer particles, the friction providing heat and mechanical stress to the polymer particles by deforming the particles until the stress orients the polymer molecules in the direction of the stress to form polyester polymer crystals;

(c) adding heat, or cooling, as needed for the crystallization by contact heat transfer through the inner wall of the crystallizer to regulate the temperature of the wall of the crystallizer to within 30° C. of the temperature of the polymer particles;

(d) maintaining the mechanical friction for a period of time between 5 and 200 minutes until sufficient mechanical friction is provided to the polymer particles to generate polymer particle temperatures exceeding the polymer crystallization temperature by between 10 and 50° C. and sufficient stress is provided to orient the polymer molecules so that the particles contain 20 and 80 percent crystals; and, (e) cooling the crystallized polyester polymer particles to ambient temperature.

20. The method of claim 19 wherein the amorphous polyester polymer particles comprises between 5 and 50 percent copolymer.

21. The method of claim 19 wherein the horizontal cylindrical crystallizer contains nitrogen gas to exclude air from contact with the polyester polymer particles.

22. The method of claim 19 wherein the horizontal cylindrical crystallizer is operated in a continuous manner.

23. The method of claim 19 wherein the fluidizing blades moving around and within between 1 and 30 millimeters of the inner perimeter wall of the crystallizer is formed in a shape selected from the group consisting of flat solid rectangles, flat solid triangles with their base turned toward the crystallizer wall, curved solid rectangles, curved solid triangles, perforated shapes, and shovel shapes.

24. The method of claim 19 wherein the amorphous polyester polymer particles are selected from the group consisting of polyethylene terephthalate, polybutylene terephthalate, polyethylene naphthalate, polyethylene naphthalene dicarboxylate, polyethylene isophthalate, and copolymers thereof.

25. A new composition of polyester polymer particles, each substantially equally crystallized to between 20 and 80 percent crystal concentration and free of agglomerates prepared by the method of claim 19.

* * * * *